United States Patent
Lei et al.

(10) Patent No.: US 12,002,972 B2
(45) Date of Patent: Jun. 4, 2024

(54) TOP COVER ASSEMBLY, BATTERY CELL, BATTERY MODULE AND MANUFACTURING METHODS THEREFOR

(71) Applicant: JIANGSU CONTEMPORARY AMPEREX TECHNOLOGY LIMITED, Jiangsu (CN)

(72) Inventors: Yuyong Lei, Jiangsu (CN); Chengyou Xing, Jiangsu (CN); Peng Wang, Jiangsu (CN)

(73) Assignee: JIANGSU CONTEMPORARY AMPEREX TECHNOLOGY LIMITED, Jiangsu (CN)

(*) Notice: Subject to any disclaimer, the term of this patent is extended or adjusted under 35 U.S.C. 154(b) by 728 days.

(21) Appl. No.: 17/138,852

(22) Filed: Dec. 30, 2020

(65) Prior Publication Data
US 2021/0119288 A1    Apr. 22, 2021

Related U.S. Application Data

(63) Continuation of application No. PCT/CN2019/121027, filed on Nov. 26, 2019.

(30) Foreign Application Priority Data

Dec. 20, 2018 (CN) .......................... 201811561743.0

(51) Int. Cl.
*H01M 50/147*    (2021.01)
*H01M 10/42*    (2006.01)
(Continued)

(52) U.S. Cl.
CPC ....... *H01M 50/147* (2021.01); *H01M 10/425* (2013.01); *H01M 50/516* (2021.01); *H01M 50/536* (2021.01)

(58) Field of Classification Search
CPC ............ H01M 50/147; H01M 50/516; H01M 50/536; H01M 10/425
(Continued)

(56) References Cited

U.S. PATENT DOCUMENTS 9,293,896 B2    3/2016    Tan et al.
9,362,536 B2 *   6/2016    Niedzwiecki ..... H01M 10/0481
(Continued)

FOREIGN PATENT DOCUMENTS

CN    102623736 A    8/2012
CN    206432298 U    8/2017
(Continued)

OTHER PUBLICATIONS

Extended European Search Report dated Nov. 28, 2023 received in European Patent Application No. EP 22183772.7.

*Primary Examiner* — James M Erwin
(74) *Attorney, Agent, or Firm* — Scully, Scott, Murphy & Presser, P.C.

(57) ABSTRACT

A top cover assembly of a battery cell, a battery cell, and a battery module. The top cover assembly of the battery cell includes: a separator plate and a top cover assembly. The separator plate is provided with sampling channel(s) for accommodating a sampling member. The top cover plate is configured for sealing an electrode assembly of the battery cell into the battery housing, where the top cover plate is provided below the separator plate, and the separator plate is fixed to the top cover plate.

18 Claims, 8 Drawing Sheets

(51) Int. Cl.
*H01M 50/516* (2021.01)
*H01M 50/536* (2021.01)

(58) Field of Classification Search
USPC ........................................................ 429/163
See application file for complete search history.

(56) References Cited

U.S. PATENT DOCUMENTS

| | | | |
|---|---|---|---|
| 10,283,751 | B2 | 5/2019 | Ichikawa et al. |
| 2012/0009447 | A1 | 1/2012 | Ikeda et al. |
| 2014/0063692 | A1 | 3/2014 | Tan et al. |
| 2016/0172651 | A1 | 6/2016 | Ichikawa et al. |
| 2016/0301049 | A1 | 10/2016 | Zhu et al. |
| 2017/0110705 | A1 | 4/2017 | Tosaya et al. |
| 2018/0075943 | A1* | 3/2018 | Okamoto ................ H01G 11/08 |
| 2018/0205062 | A1 | 7/2018 | Nakayama et al. |
| 2018/0261804 | A1* | 9/2018 | Bayles ................ H01M 50/227 |
| 2019/0067663 | A1 | 2/2019 | Li et al. |
| 2019/0326582 | A1* | 10/2019 | Berels ...................... B60K 1/04 |
| 2021/0175586 | A1 | 6/2021 | Haruki et al. |

FOREIGN PATENT DOCUMENTS

| | | | | |
|---|---|---|---|---|
| CN | 206490102 U | * | 9/2017 | ............. H01M 2/02 |
| CN | 206947422 U | | 1/2018 | |
| CN | 207233789 U | | 4/2018 | |
| CN | 207441843 U | | 6/2018 | |
| CN | 108428824 A | | 8/2018 | |
| CN | 208028110 U | | 10/2018 | |
| CN | 109546019 A | | 3/2019 | |
| DE | 112017000545 T5 | | 10/2018 | |
| JP | 2018137081 A | | 8/2018 | |
| JP | 2018163847 A | | 10/2018 | |
| WO | 2015101269 A1 | | 7/2015 | |

* cited by examiner

TOP COVER ASSEMBLY, BATTERY CELL, BATTERY MODULE AND MANUFACTURING METHODS THEREFOR

CROSS-REFERENCE TO RELATED APPLICATIONS

This application is a continuation of International Application No. PCT/CN2019/121027, filed on Nov. 26, 2019, which claims priority to Chinese Patent Application No. 201811561743.0, filed on Dec. 20, 2018 and entitled "TOP COVER ASSEMBLY, BATTERY CELL AND BATTERY MODULE", the entire content of which is incorporated herein by reference.

TECHNICAL FIELD

Some embodiments of the present application relate to the field of battery module technology, specifically relate to a top cover assembly of a battery cell, a battery cell and a battery module.

BACKGROUND

At present, with the booming development of the new energy vehicle industry, the safety of a battery module is attracting more and more attention. In order to avoid a short circuit between the electrode connection sheet and sampling member etc. and a top cover plate of a battery cell, a battery module is usually isolated by an integral harness isolating plate, i.e., the integral harness isolating plate is used for the battery module.

SUMMARY

Therefore, the purpose of some embodiments of the present application is that a top cover assembly of a battery cell, a battery cell and a battery module are required to provide for solving current technical problems in prior art.

Some embodiments of the present application provide a top cover assembly, for a battery cell, including:
  a separator plate, where the separator plate is provided with a sampling channel(s) for accommodating a sampling member; and
  a top cover plate, where the top cover plate is configured to seal an electrode assembly of the battery cell into the battery housing,
  among them, the top cover plate is provided below the separator plate, and the separator plate is fixed to the top cover plate.

In some embodiments, the separator plate is fixed to the top cover plate by means of bonding, bolting, bolt connection, riveting, clamping, or interference fit.

In some embodiments, a bottom of the separator plate is provided with a protrusion portion, a top of the top cover plate is provided with a blind hole, and the protrusion portion is accommodated in the blind hole so as to fix the separator plate to the top cover plate; or
  a top of the top cover plate is provided with a projection portion, the separator plate is provided with a through hole, and the projection part penetrates the through hole and rivets the separator plate so as to fix the separator plate to the top cover plate.

In some embodiments, the separator plate is further provided with an electrode connecting sheet positioning structure and the electrode connecting sheet positioning structure is configured to limit displacement of an electrode connecting sheet.

In some embodiments, the separator plate includes a first plate and a second plate, the first plate and the second plate both extend along a widthwise direction and are disposed opposite each other along a lengthwise direction, and the sampling channel(s) is formed between the first plate and the second plate.

In some embodiments, the number of the first plate is two, and the two first plates are disposed opposite each other along the lengthwise direction; the number of the second plate is two, and the two second plates are disposed opposite each other along the lengthwise direction; three sampling channels (111) are formed between the two first plates and the two second plates.

In some embodiments, the separator plate is provided with a pole through hole, the pole through hole is configured to penetrate a pole of the battery cell, and the first plate is provided with a sampling opening for the sampling member to penetrate.

In some embodiments, the sampling channel(s) is disposed on an upper surface of the separator plate, a recess is disposed on a lower surface of the separator plate, the recess is disposed opposite an explosion-proof valve of the battery cell, and the recess extends along a widthwise direction.

Distinctive from prior art, in the foregoing technical solution, the separator plate is directly fixed to the top cover plate of a battery cell, and one separator plate corresponds to one top cover plate of the battery cell, replacing an integral separator plate of the battery module in the prior art. At this time, no matter how the arrangement of the battery cells is updated, there is no need to change the structure of the separator plate to meet assembly requirements of the battery module. The technical solution can be applied to battery modules with different assembly methods, which greatly improves the efficiency of assembly of the battery module with strong the adaptability and high the versatility, and can effectively reduce the research and manufacturing costs of a battery system.

Some embodiments of the present application provide a battery cell, including:
  a battery housing, with an opening;
  an electrode assembly, accommodated in the housing; and
  the top cover assembly of the battery cell provided in the foregoing description, and the top cover assembly covers the opening.

Distinctive from prior art, in the foregoing technical solution, the separator plate is directly fixed to the top cover plate of the battery cell to achieve a battery cell with a utilized separator plate. In this way, it can be applied to battery modules with different assembly methods, and is of great adaptability, high versatility, and can effectively reduce the cost of the battery system.

Some embodiments of the present application provide a battery module, including:
  more than two of the battery cells according to the foregoing description, where more than two of the battery cells are arranged in sequence, the sampling channels among more than two of the battery cells are connected to each other, and more than two of the battery cells are electrically connected by the electrode connecting sheet; and
  the sampling member, where the sampling member is accommodated in the sampling channels.

Distinctive from prior art, in the foregoing technical solution, separator plates of a battery module are integrated to the top cover plates of each battery cell, and no matter how the arrangement of the battery cells is modified, there is no need to change the structure of the separator plate to meet assembly requirements of the battery module, which greatly improves the efficiency of battery module assembly, reduces the research and manufacturing costs.

Some embodiments of the present application provide a manufacturing method for a top cover assembly, including following steps:

providing a separator plate and a top cover plate configured to seal an electrode assembly of a battery cell into a battery housing; where a pole is disposed on the top cover plate, a pole through hole and a sampling channel(s) for accommodating a sampling member are disposed on the separator plate;

covering the separator plate on the top cover plate, so that the pole through hole of the separator plate penetrates the pole of the top cover plate;

and fixing the separator plate to the top cover plate to obtain a top cover assembly.

In the step of covering the separator plate on the top cover plate, specifically includes:

providing a backside blind hole to the top cover plate;
making a protrusion portion at a bottom of the separator plate;
extending the protrusion portion into the blind hole until the separator plate is attached to the top cover plate; or
making a projection portion at a top of the top cover plate;
providing a through hole to the separator plate;
and making the projection portion penetrate the through hole until the separator plate is attached to the top cover plate.

Some embodiments of the present application provide a manufacturing method for a battery cell, including following steps:

providing a battery housing equipped with an electrode assembly, and the top cover assembly produced with the manufacturing method for a top cover assembly according to the foregoing description; where the battery housing is provided with an opening;

and assembling the top cover assembly and the battery housing so that the top cover plate seals the opening to produce the battery cell.

Some embodiments of the present application provide a manufacturing method for a battery module, including following steps:

providing a sampling member, at least one electrode connecting sheet and a plurality of battery cells produced with the manufacturing method for the battery cell according to the foregoing description;

arranging the plurality of battery cells along a preset direction, so that sampling channels on each battery cell communicate with each other;

welding at least one of the electrode connecting sheet to the poles of the plurality of battery cells, so that the plurality of the battery cells are connected in parallel or in series among them;

connecting one end of the sampling member to the electrode connecting sheet, and introducing the other end of the sampling member to the sampling channel so that the battery module.

The separator plate of each battery cell is further provided with an electrode connecting sheet positioning structure: after the step of arranging the plurality of battery cells along the preset direction and before the step of welding the electrode connecting sheet to the pole of the plurality of battery cells, where further includes a following step:

positioning the electrode connecting sheet with the electrode connecting sheet positioning structure of each battery cell.

REFERENCE SIGNS 1. battery cell,
11. Separator,
111. sampling channel,
112. protrusion portion,
1121. end portion of the protrusion portion,
1122. middle portion of the protrusion portion,
113. electrode connecting piece positioning structure,
1131. positioning buckle,
1132. positioning block,
114. first plate,
1141. sampling opening,
115. second plate,
1151. harness guiding groove,
116. pole through hole,
117. recess,
118. through hole,
12. top cover plate,
121. blind hole,
122. injection hole,
113. projection portion,
13. pole connecting member,
14. battery housing,
141. opening,
15. electrode assembly,
16. pole,
2. electrode connecting piece,
31. flexible circuit board, and
32. harness.

DESCRIPTION OF EMBODIMENTS

In order to elaborate the technical content, construction feature, achieved objective and effect of the technical solution, embodiments are hereinafter described with reference to the accompanying drawing:

In the description of the present application, unless otherwise specified and limited explicitly, the terms "first", and "second" are merely intended for a purpose of description, and shall not be understood as an indication or implication of relative importance. Unless otherwise specified or illustrated, the term "a plurality of" refers to two or more than two; the term "connection", "fixation" and like should be understood broadly, for example, the "connection" may either be a fixed connection, or a detachable connection, or an integrated connection, or an electrical connection, or a signal connection; and the "connection" may either be a direction connection, or an indirect connection through an intermediary. A person of ordinary skill in the art may understand the specific meanings of the foregoing terms in embodiments of the present application according to specific circumstances.

In the description of the specification, it should be understood that nouns of locality such as "upper", "lower", "left", and "right" described in the embodiments of the present application are described from the angles shown in the accompanying drawings, and should not be understood as limitation on the embodiments of the present application. In addition, in the context, it should be understood that, when it is mentions an element connecting to "upper" or "lower" of another element, the element can not only directly connect to the "upper" or "lower" of another element, but can connect to the "upper" or "lower" of another element by intermediate element.

In all accompanying drawings, a direction of arrow x indicates the lengthwise direction, a direction of arrow y indicates the widthwise direction, and a direction of arrow z indicates the height direction.

At present, because the size of a battery module varies according to the type of a battery cell and the arrangement of the battery cell. When the battery cell is updated, iterated or adopts a new arrangement, it means that different integral harness separator needs to be designed, which increases the time and labor cost of research. Different integral harness separators mean that different injection molds need to be manufactured, new production lines need to be established, which, in the meantime, will also increase the cost of the entire battery system.

Figure 1:
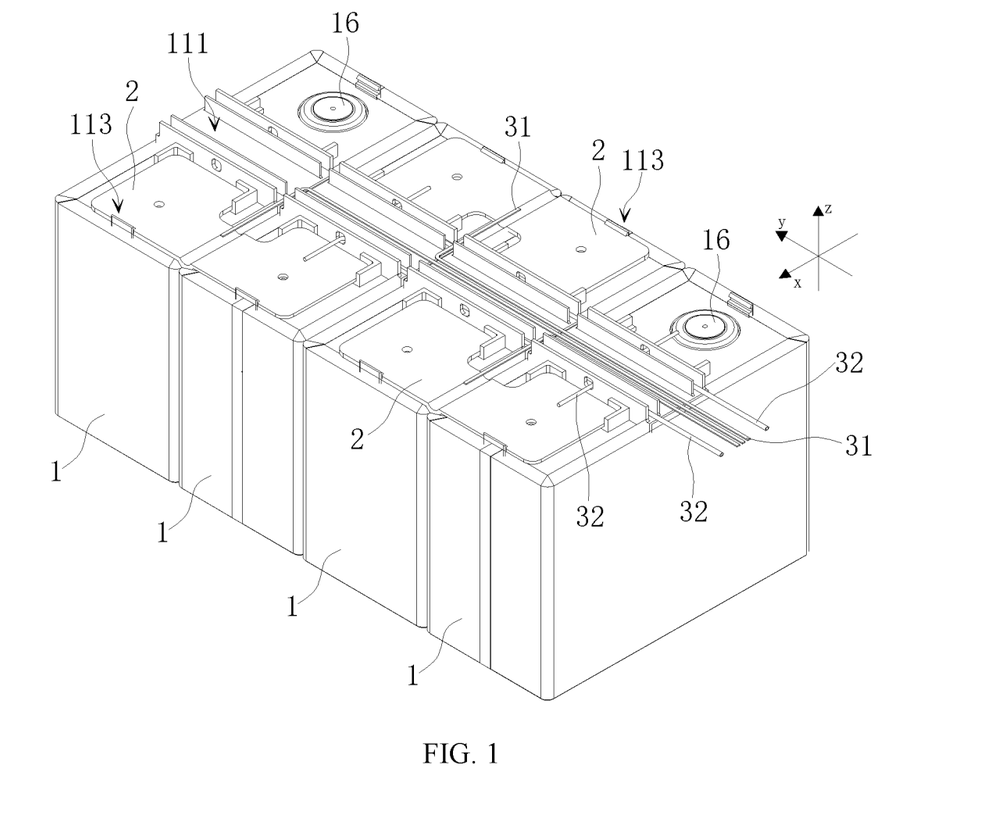
FIG. 1 is a schematic structural diagram of the battery module.

Based on this, please refer to FIG. 1. Some embodiments of the present application relate to a battery module. The battery module includes more than two battery cells 1 (for example, two, three, four, or ten), and more than two battery cells 1 are arranged in sequence. It is worth noting that the arrangement of the battery cells 1 is not limited to the arrangement along the widthwise direction (that is, the direction indicated by the arrow y in the figure) in the embodiment in FIG. 1. The battery cells 1 can be arranged along the lengthwise direction (that is, the direction indicated by the arrow x in the figure) or with the method of staggered arrangement.

In some embodiments, two or more battery cells 1 are electrically connected through the electrode connecting sheet 2 so that the battery cell 1 and other battery cells 1 are connected in parallel or in series.

Figure 2:
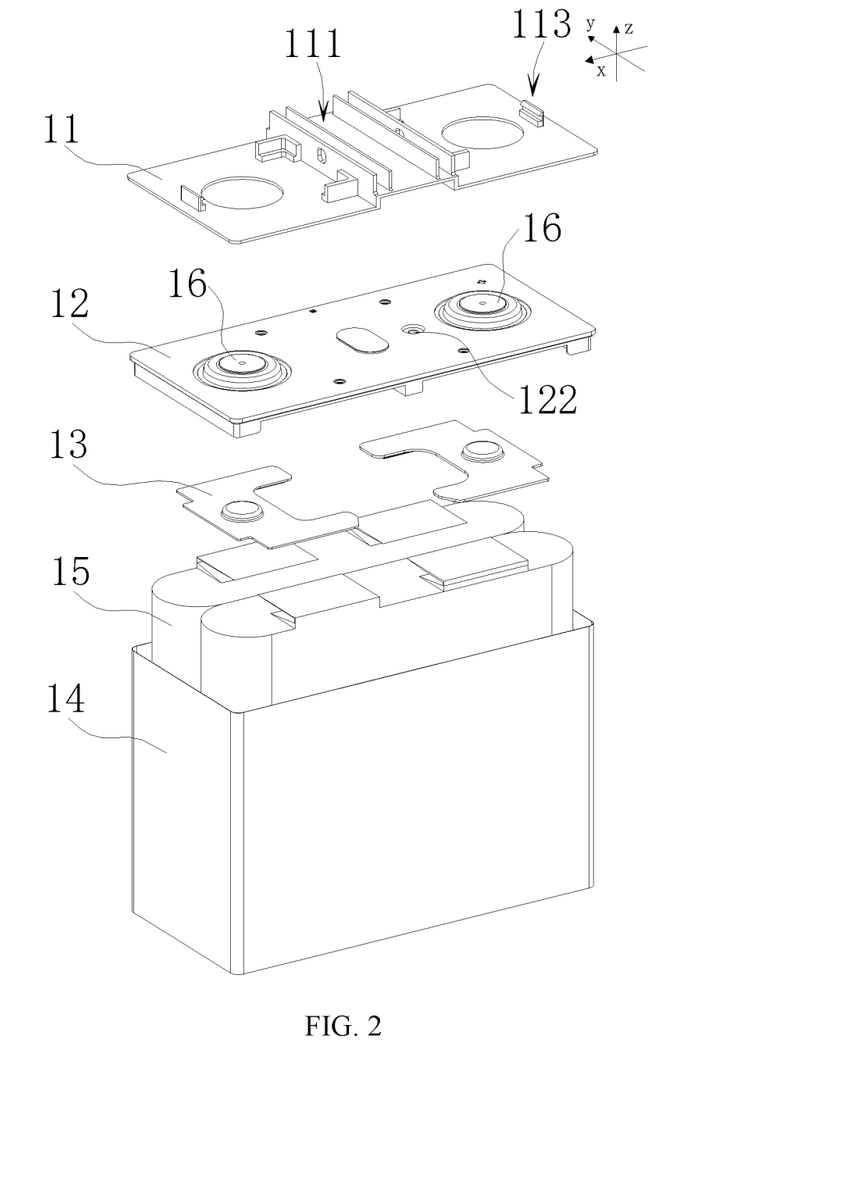
FIG. 2 is an exploded view of the battery cell.

As shown in FIG. 2, in some embodiments, the battery cell 1 includes a top cover plate, an electrode assembly 15 and a battery housing 14. The top cover assembly includes a separator plate 11, a top cover plate 12, a pole 16 and a pole connecting member 13. In some embodiments, the top cover plate is provided with two poles 16, that is, a positive pole and a negative pole respectively.

In some embodiments, the separator plate 11 is provided with three sampling channels 111 for accommodating sampling members. In some embodiments, the sampling member may be one or more of a flexible circuit board (FPC) 31, a printed circuit board (PCB) and a harness 32. For example, the sampling channel 111 in the middle may be configured to accommodate the flexible circuit board 31 (FPC), and the sampling channels 111 on both sides may be configured to accommodate the harness 32. After two or more battery cells 1 form the battery module, the sampling channels 111 between the two or more battery cells 1 communicate with each other.

In some embodiments, a material of the top cover 12 is metal, but not limited to aluminum, steel, etc., and other metal materials can also be used as well. The shape of the pole 16 on the top cover 12 is not limited to a circle, a triangle and a square, etc. The top cover 12 is provided with an injection hole 122 for injecting electrolyte into the battery cell 1.

In some embodiments, the battery housing 14 may have a hexahedral shape or other shapes. The battery housing 14 has an internal space accommodating the electrode assembly 15 and the electrolyte, and the battery housing 14 has an opening. The electrode assembly 15 is accommodated in the battery housing 14. The top cover assembly covers the opening and is configured to seal the electrode assembly 15 into the battery housing 14. The electrode assembly 15 and the pole 16 are electrically connected by a pole connecting member 13. In some embodiments, there are two pole connecting members 13, that is, a positive connecting member and a negative connecting member. The battery housing 14 may be made of materials such as aluminum, aluminum alloy, or plastic etc.

In some embodiments, the electrode assembly 15 may be formed by stacking or winding a first electrode plate, a second electrode plate, and a membrane together to form a main body portion, where the membrane is an insulator between the first electrode plate and the second electrode plate. In some embodiments, it is exemplarily illustrated that the first electrode plate is a positive electrode plate and the second electrode plate is a negative electrode plate. Similarly, in other embodiments, the first electrode plate may also be a negative plate, while the second electrode plate is a positive plate. Besides, a positive active substance is coated on the coating region of the positive electrode plate, and a negative active substance is coated on the coating area of the negative electrode plate. The uncoated area extending from the main body portion is used as a tab. The electrode assembly 15 includes two tabs, namely a positive tab and a negative tab. The positive tab extends from the coating region of the positive tab; the negative tab extends from the coating region of the negative tab. The positive tab is electrically connected to the positive pole by the positive connecting member, and the negative tab is electrically connected to the negative pole by the negative connecting member.

In some embodiments, the separator plates 11 of the battery module are integrated to the top cover plates 12 of each battery cell 1, and one battery cell 1 corresponds to one separator plate 11. No matter how the arrangement of the battery cells is modified, there is no need to change the structure of the separator plate 11 to meet assembly requirements of the battery module, which greatly improve the efficiency of battery module assembly, reduce research and manufacturing costs.

Figure 3:
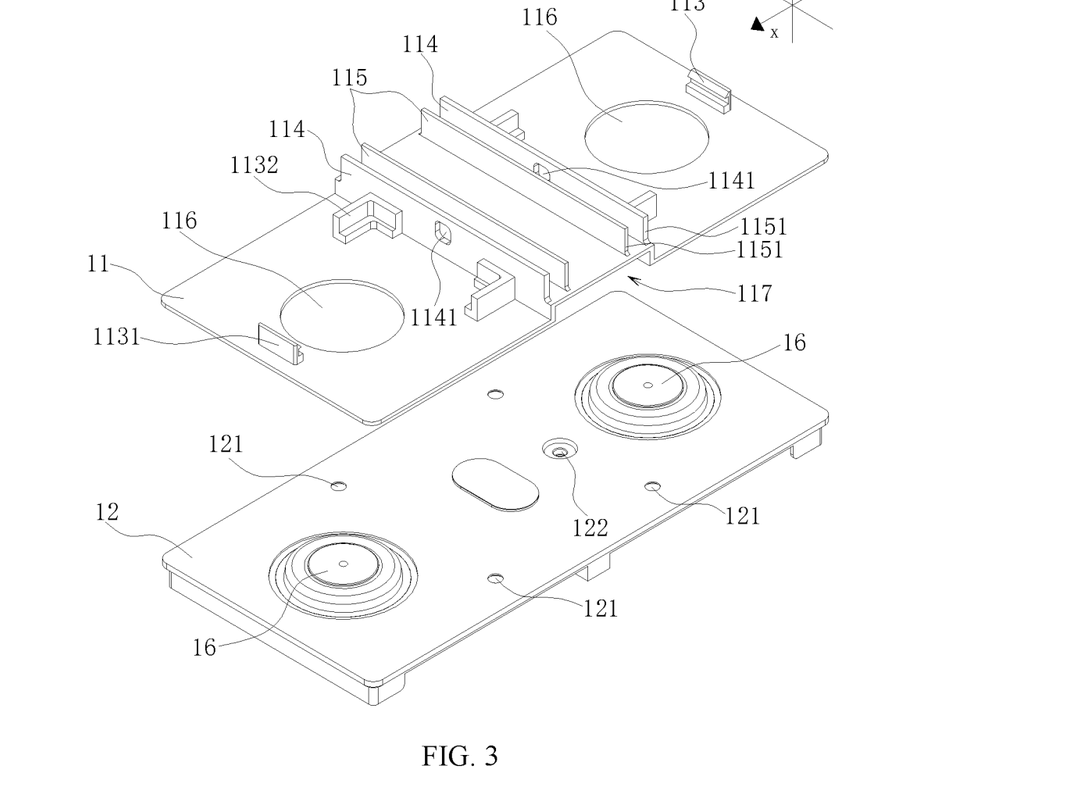
FIG. 3 is a schematic structural diagram of the top cover assembly of the battery cell.
Figure 4:
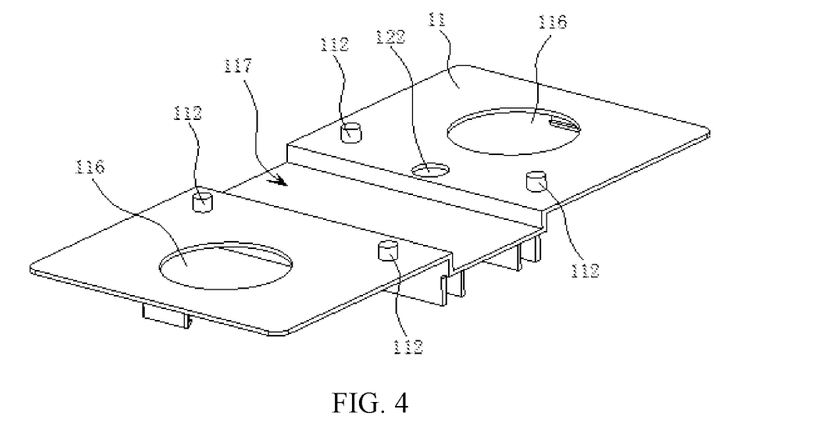
FIG. 4 is a schematic structural diagram of the bottom of the separator plate.

As shown in FIG. 3 and FIG. 4, in some embodiments, a top cover assembly includes a separator plate 11 and a top cover plate 12, where the top cover plate 12 is provided below the separator plate 11, and the separator plate 11 is arranged corresponding to the top cover plate 12 and fixed to the top cover plate 12. The corresponding arrangement refers to the size and shape of the separator plate 11 is substantially identical to the size and shape of the top cover plate 12.

In some embodiments, the separator plate 11 is provided with a protrusion portion 112, an electrode connecting positioning structure 113 and a recess 117.

In some embodiments, a bottom of the separator plate 11 is provided with four protrusion portions 112, and a top of the top cover plate 12 is provided with four blind holes 121 used for accommodating the protrusion portions 112. It should be noted that, the separator plate 11 may be provided with one protrusion portion 112, and the top cover plate 12 may be provided with one blind hole, but the number of the protrusion portion 112 and the number of the blind hole 121 are not limited hereto.

Optionally, a bottom of the separator plate 11 is provided with a protrusion portion 112, a top of the top cover plate 12 is provided with a blind hole 121, and the protrusion portion 112 is accommodated in the blind hole 121 so as to fix the separator plate 11 to the top cover plate. Preferably, the material of the separator plate 11 is plastic. It can be implemented by means of integrally injection molding (that is, the top cover 12 is placed in a mold, and the separator plate 11 is formed by injection molding. During the injection molding process, the plastic will flow into the blind hole 121 and solidify to form the protrusion portion 112). The separator plate 11 can also be formed by first injection molding and then introducing the protrusion portion 112 into the blind hole 121, and melting the protrusion 112 by means of ultrasonic fusion, so that the solidified protrusion 112 and the blind hole 121 are tightly combined, thereby improving the bonding strength between the protrusion 112 and the blind hole 121.

Figure 11:
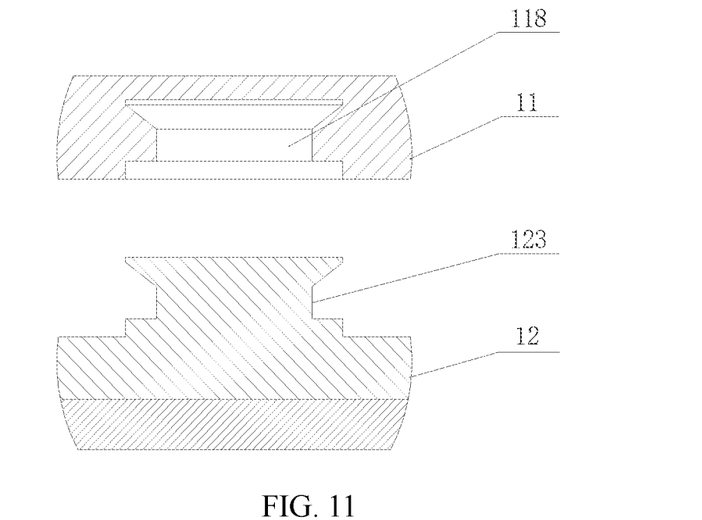
FIG. 11 is a schematic diagram of the state of the separator plate and the top cover plate during manufacturing.

Optionally, in some embodiments, as shown in FIG. 11, the top of the top cover plate 12 is provided with a projection portion 123, the separator plate 11 is provided with a through hole 118, and the projection part 123 penetrates the through hole 118 and rivets the separator 11 so as to fix the separator plate 11 to the top cover plate 12. Alternatively, it may also be implemented by providing the top of the top cover plate 12 with a projection portion and providing the separator plate 11 with a hole (which may be a through hole or a blind hole). A diameter of the projection portion is greater than a diameter of a hole, so that the projection portion inserts the hole so as to implement an interference fit.

In other embodiments, the separator plate 11 may be fixed to the top cover plate 12 by other fixing method, for example, it may be implemented by means of bonding, bolt connection, riveting, clamping, or interference fit, where the way of bonding includes adhesive bonding, solvent borne bonding and like. Bonding and riveting are non-detachable fixed connections, and bolt connection, clamping, or interference fit are detachable fixed connections.

Optionally, in some embodiments, the electrode connecting sheet positioning structure 113 on the separator plate 11 includes a positioning buckle 1131 and two positioning blocks 1132. The two positioning blocks 1132 are disposed opposite the electrode connecting sheet 2, and the two positioning blocks 1132 are configured to limit displacement of the electrode connecting sheet 2 in the widthwise direction (that is, the direction indicated by the arrow y in the figure), and the positioning buckle 1131 is configured to limit displacement of the electrode connecting sheet 2 in the lengthwise direction (that is, the direction indicated by the arrow x in the figure) and height direction (that is, the direction indicated by the arrow z in the figure).

It should be noted that the electrode connecting sheet positioning structure 113 is not limited to some embodiments in FIG. 3. The electrode connecting sheet 2 can also be positioned by other embodiments, for example, binding positioning, bolt positioning, and clamping positioning. As long as the electrode connecting sheet 2 can be positioned, the method is within the scope of implementation of each embodiment.

In some embodiment, the sampling channel(s) 111 is disposed on an upper surface of the separator plate 11 and the recess 117 is disposed on a lower surface of the separator 117. The recess 117 extends along the widthwise direction (that is, the direction indicated by the arrow y in the figure) and covers an explosion-proof valve, and communicates with the outside atmosphere at openings on left and right ends of the separator plate 11 The arrangement of the recess 17 can effectively lead the combustible gas emitted by rapturing the explosion-proof valve to the outside of the battery module in an unexpected situation when a single battery cell 1 fails, avoiding a cascading failure of other single cells in the single battery module 1.

Optionally, in some embodiments, the separator plate 11 includes a first plate 114 and a second plate 115. Both the first plate 114 and the second plate 115 extend in the widthwise direction (that is, the direction indicated by the arrow y in the figure) and are arranged opposite along the lengthwise direction (that is, the direction indicated by the arrow x in the figure), and a sampling channel 111 is formed between the first plate 114 and the second plate 115.

Figure 5:
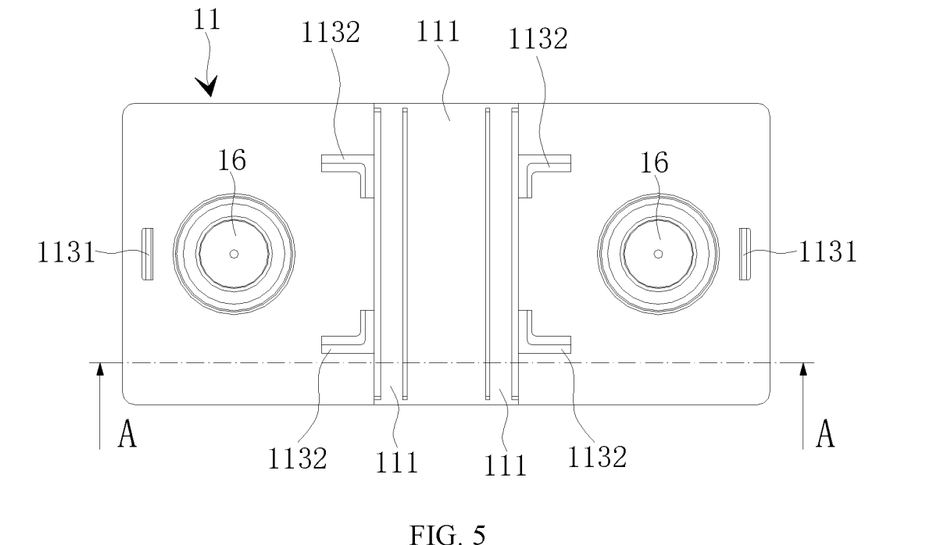
FIG. 5 is a vertical view of the top cover assembly of the battery cell.
Figure 6:
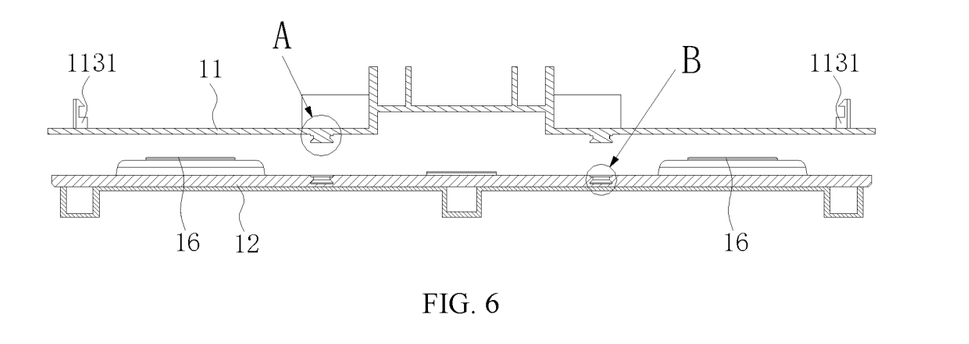
FIG. 6 is a sectional view of the point A-A in FIG. 5.
Figure 7:
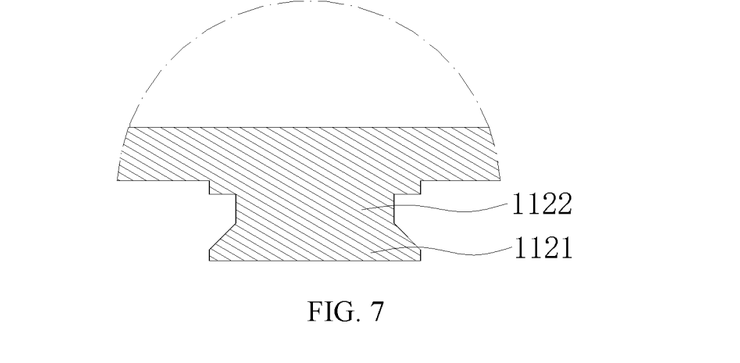
FIG. 7 is an enlarged schematic diagram of the point A in FIG. 6.
Figure 8:
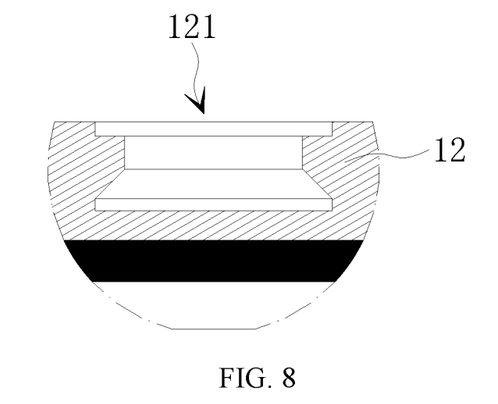
FIG. 8 is an enlarged schematic diagram of the point B in FIG. 6.
Figure 9:
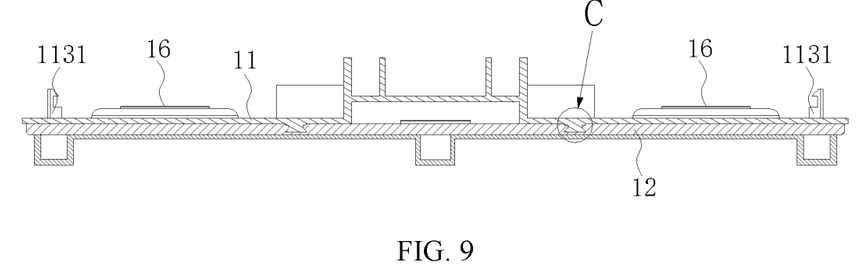
FIG. 9 is a sectional view of the use state of the separator plate and the top cover plate.
Figure 10:
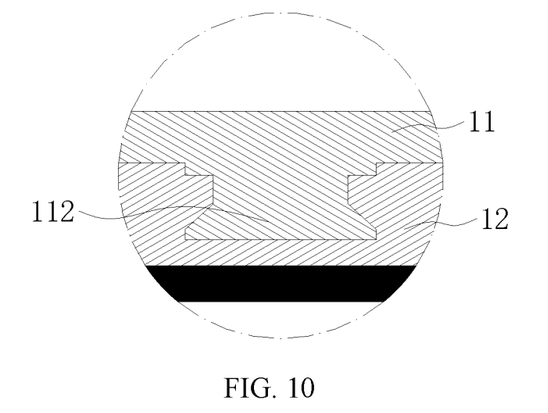
FIG. 10 is an enlarged schematic diagram of the point C in FIG. 9.

Optionally, the number of the first plate 114 is two, and the two first plates 114 are disposed opposite each other along the lengthwise direction (that is, the direction indicated by the arrow x in the figure); the number of the second plate 115 is two, and the two second plates 115 are disposed opposite each other along the lengthwise direction (that is, the direction indicated by the arrow x in the figure); the two first plates 114 and the two second plates 115 form three sampling channels among them, as shown in FIG. 5.

Among them, the sampling channel 111 in the middle can be configured to guide and constrain the flexible circuit board 31, and the sampling channels 111 on both sides can be configured to guide and constrain the harness 32, thereby achieving electrical isolation between the flexible circuit board 31 and the harness 32.

Optionally, in some embodiments, a pole through hole 116 is arranged on the separator plate 11, the pole through hole 116 corresponding to the pole 16 of the battery cell 1. The pole through hole 116 is configured to penetrate the pole 16 of the battery cell 1, and a sampling opening 1141 is arranged on the first plate 114, providing for the sampling member to penetrate, and the sampling opening 1141 is arranged corresponding to the pole through hole 116. The sampling opening 1141 may be a through-hole structure or a recess structure that penetrates a top of the first plate 114. In some embodiments, the sampling opening 1141 is a through-hole structure. In this way, a sampling member enters the sampling channel(s) 111 through the sampling opening 1141, which facilitates the tidiness and guidance of the sampling member.

Optionally, in some embodiments, both ends of the first plate 114 and the second plate 115 are provided with harness guiding grooves 1151. The harness guiding groove 1151 on the first plate 114 and the second plate 115 between the two adjacent battery cells 1 can tidy and guide the flexible circuit board 31, so as to implement an isolation between the flexible circuit board 31 and other sampling members.

During the using process, as shown in FIGS. 6 to 10, in some embodiments, a bottom of the separator plate 11 is provided with four protrusion portions 112, and a top of the top cover plate 12 is provided with four blind holes 121 to accommodate the protrusion portions 112. The cross-sectional area of an end portion of the protrusion portion 1121 is greater than the cross-sectional area of a middle portion of the protrusion portion 1122. During the process of assembling, the protrusion portion 112 is extended into the blind hole 121, and the separator plate 11 and the top cover plate 12 are ultrasonically fused to complete the fixation of the separator plate 11 and the top cover plate 12.

Figure 12:
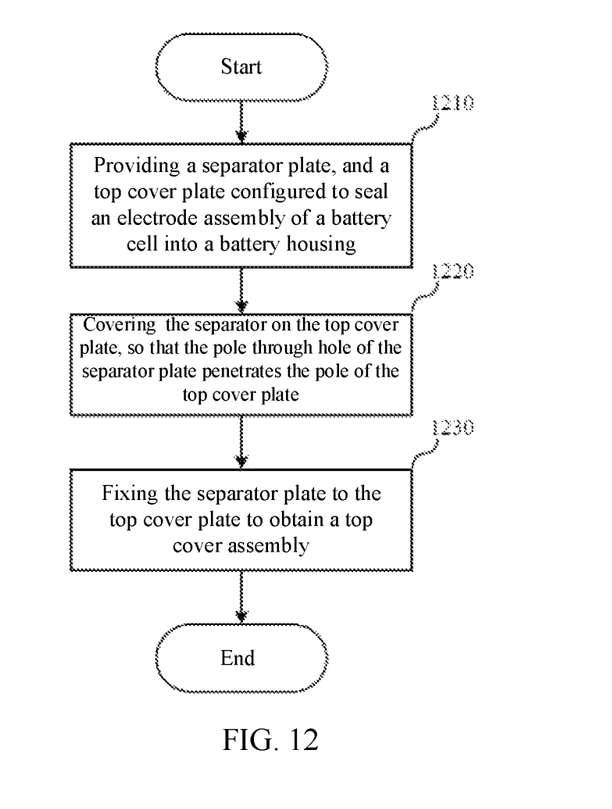
FIG. 12 is a block diagram of the manufacturing method of the top cover plate.

It is not difficult to see from the technical solutions of the foregoing embodiments that some embodiments of the present application further provide a manufacturing method for a top cover assembly, with reference to FIG. 12, including the following steps:

step 1210, providing a separator plate 11 and a top cover plate 12 configured to seal an electrode assembly 15 of the battery cell 1 into the battery housing 14. A pole 16 is disposed on the top cover plate 12, a pole through hole 116 and sampling channel(s) 111 for accommodating a sampling member are disposed on the separator plate 11;

step 1220, covering the separator plate 11 on the top cover plate 12, so that the pole through hole 116 of the separator plate 11 penetrates the pole 16 of the top cover plate 12;

and step 1230, fixing the separator plate 11 to the top cover plate 12, so that a top cover assembly is obtained.

In step 1220, that is, in the step of covering the separator plate 11 on the top cover plate 12, specifically includes:

providing a backside blind hole 121 to the top cover plate 12;

making a protrusion portion 112 at a bottom of the separator plate 11;

extending the protrusion portion 112 into the blind hole 121 until the separator plate 11 is attached to the top cover plate 12; or making a projection portion 123 at a top of the top cover plate 12;

providing a through hole 118 to the separator plate 11;

and making the projection portion 123 penetrate the through hole 118 until the separator plate 11 is attached to the top cover plate 12.

Figure 13:
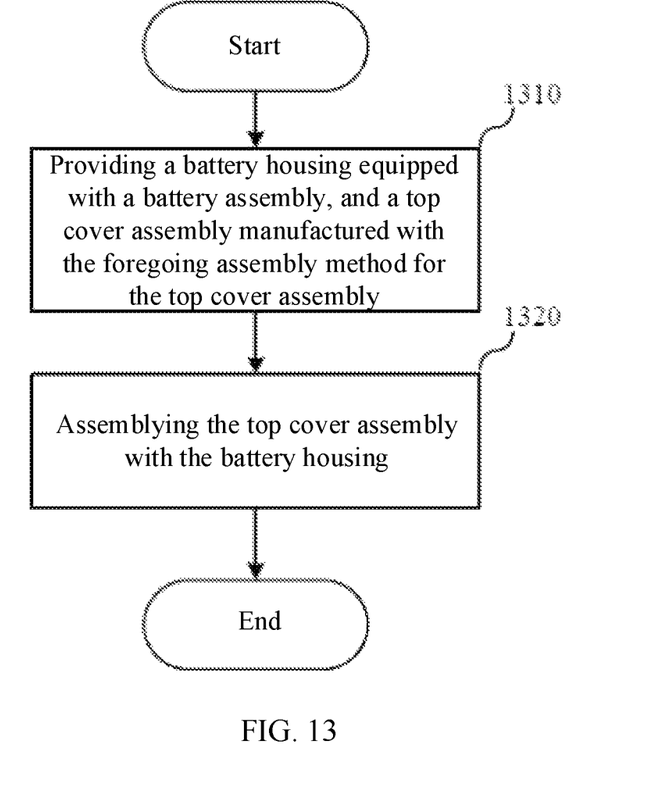
FIG. 13 is a block diagram of the manufacturing method of the battery cell.

In addition, some embodiments of the present application further provide a manufacturing method for a battery cell, with reference to FIG. 13, including following steps:

step 1310, providing a battery housing 14 equipped with an electrode assembly 15, and the top cover assembly produced with the assembly method for the top cover assembly;

among them, a battery housing 14 has an opening;

and step 1320, assembling the top cover assembly and the battery housing 14 so that the top cover plate 12 seals the opening 141 to produce a battery cell 1.

Figure 14:
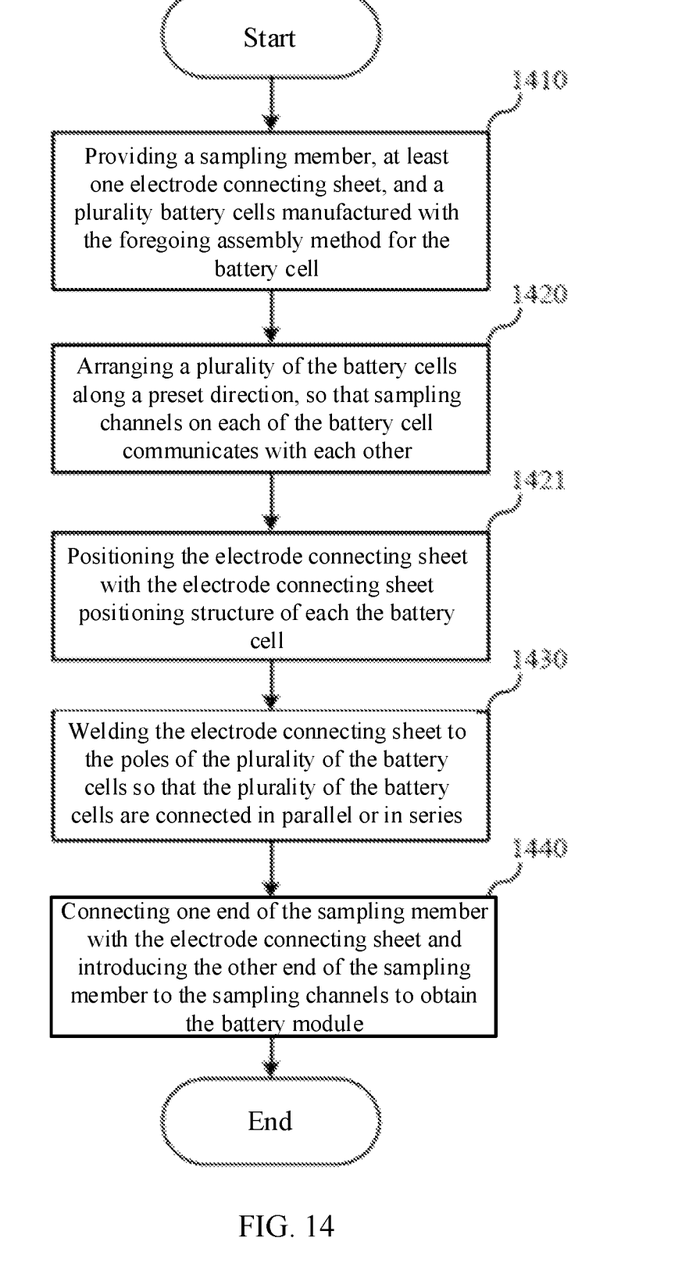
FIG. 14 is a block diagram of the manufacturing method of the battery module.

In addition, some embodiments of the present application further provide a manufacturing method for a battery module, with reference to FIG. 14, including following steps:

step 1410, providing a sampling member, at least one electrode connecting sheet 2 and a plurality of battery cells 1 produced with the manufacturing method for a battery cell;

step 1420, arranging the plurality of battery cells 1 along a preset direction, so that sampling channels 111 on each battery cell 1 communicate with each other;

step 1430, welding at least one of the electrode connecting sheet 2 to the poles 16 of the plurality of battery cells 1, so that each battery cell 1 is connected in parallel or in series among them;

and step 1440, connecting one end of the sampling member to the electrode connecting sheet 2, and introducing the other end of the sampling member to the sampling channel 111 so that the battery module is obtained In some embodiments, the separator plate 11 of each battery cell is also provided with an electrode connecting sheet positioning structure 113. Therefore, after the step of arranging the plurality of battery cells 1 along the preset direction and before the step of welding the electrode connecting sheet 2 to the pole 16 of the plurality of battery cells 1, that is, before the step 1430, following step is also included:

step 1421, positioning the electrode connecting plate 2 with the electrode connecting sheet positioning structure 113 of each battery cell 1. Thus, it is more stable when welding the electrode connecting sheet 2 and the pole 16 of the plurality of battery cells 1.

The foregoing manufacturing process of the battery module is as follows.

S1, the top cover plate 12 punches out the backside blind hole 121 in the stamping stage, the protrusion portion 112 is introduced in the blind hole 121, the separator plate 11 and the top cover plate 12 are ultrasonically fused to complete the fixation of the separator plate 11 and the top cover plate 12.

S2, after assembling the top cover plate 12 integrated with the separator plate 11 and the battery housing 14 equipped with the electrode assembly 15, a complete battery cell 1 is obtained.

S3, the battery cells 1 are arranged according to the needs of assembly the battery module, and the battery cells 1 are formed with required arrangement way to a battery module, as shown in FIG. 1.

S4, the electrode connecting sheet 2 is placed on the positioning block 1132 for pre-positioning, a downward pressure is applied until the electrode connecting sheet 2 is locked by the positioning buckle 1131, then the positioning of the electrode connecting sheet 2 is completed, and the electrode connecting sheet 2 is laser-welded with the electrode pole, as shown in FIG. 1.

S5, one end of the sampling member is connected to the electrode connecting sheet 2, and enters to the sampling channels on the two side through the sampling opening 1141, as shown in FIG. 1.

S6, the flexible circuit board 31 is disposed in the middle sampling channel 111 through a harness buckle as shown in FIG. 1.

Distinctive from prior art, in some embodiments, because the separator plate 11 is integrated on the battery cell 1, the assembly requirements of battery modules of different numbers and different grouping methods can be met, and the integration efficiency of the battery modules is greatly improved, and the production cost of battery modules and their research cycle is reduced.

It should be noted that, the foregoing embodiments are described herein, but does not thus limit the patent protection scope of the present application. Therefore, based on the innovative concept of the present application, modifications and amendments to the embodiments described herein, or equivalent structures or equivalent process modifications used according to the contents of the specification and accompanying drawings in the present application, no matter whether it is directly or indirectly used in any other related technical field, should be included within the protection scope of the present application.

What is claimed is:

1. A top cover assembly, for a battery cell, comprising:
    a separator plate, wherein the separator plate is provided with sampling channel(s) for accommodating a sampling member; and
    a top cover plate, wherein the top cover plate is configured to seal an electrode assembly of the battery cell into a battery housing,
    wherein the top cover plate is provided below the separator plate, and the separator plate is fixed to the top cover plate;
    wherein the separator plate comprises a first plate and a second plate, the first plate and the second plate both extend along a widthwise direction and are disposed opposite each other along a lengthwise direction, and the sampling channel(s) is formed between the first plate and the second plate;
    the sampling channel(s) is disposed on an upper surface of the separator plate, a recess is disposed on a lower surface of the separator plate, the recess is disposed opposite an explosion-proof valve of the battery cell, and the recess extends along a widthwise direction.

2. The top cover assembly according to claim 1, wherein the separator plate is fixed to the top cover plate by means of bonding, bolt connection, riveting, clamping, or interference fit.

3. The top cover assembly according to claim 1, wherein a bottom of the separator plate is provided with a protrusion portion, a top of the top cover plate is provided with a blind hole, and the protrusion portion is accommodated in the blind hole so as to fix the separator plate to the top cover plate.

4. The top cover assembly according to claim 1, wherein a top of the top cover plate is provided with a projection portion, the separator plate is provided with a through hole, and the projection part penetrates the through hole and rivets the separator plate so as to fix the separator to the top cover plate.

5. The top cover assembly according to claim 1, wherein the separator plate is further provided with an electrode connecting sheet positioning structure, and the electrode connecting sheet positioning structure is configured to limit displacement of an electrode connecting sheet.

6. The top cover assembly according to claim 1, wherein the number of the first plate is two, and the two first plates are disposed opposite each other along the lengthwise direction; the number of the second plate is two, and the two second plates are disposed opposite each other along the lengthwise direction; three sampling channels are formed between the two first plates and the two second plates.

7. The top cover assembly according to claim 6, wherein the separator plate is provided with a pole through hole, the pole through hole is configured to penetrate a pole of the battery cell, and the first plate is provided with a sampling opening for the sampling member to penetrate.

8. A battery cell, comprising:
    a battery housing, with an opening;
    an electrode assembly, accommodated in the battery housing; and
    a top cover assembly, comprising:
        a separator plate, wherein the separator plate is provided with sampling channel(s) for accommodating a sampling member; and
        a top cover plate, wherein the top cover plate is configured to seal an electrode assembly of the battery cell into a battery housing,
    wherein the top cover plate is provided below the separator plate, and the separator plate is fixed to the top cover plate, and the top cover assembly covers the opening;
    wherein the separator plate comprises a first plate and a second plate, the first plate and the second plate both extend along a widthwise direction and are disposed opposite each other along a lengthwise direction, and the sampling channel(s) is formed between the first plate and the second plate;
    the sampling channel(s) is disposed on an upper surface of the separator plate, a recess is disposed on a lower surface of the separator plate, the recess is disposed opposite an explosion-proof valve of the battery cell, and the recess extends along a widthwise direction.

9. The battery cell according to claim 8, wherein the separator plate is fixed to the top cover plate by means of bonding, bolt connection, riveting, clamping, or interference fit.

10. The battery cell according to claim 8, wherein a bottom of the separator plate is provided with a protrusion portion, a top of the top cover plate is provided with a blind hole, and the protrusion portion is accommodated in the blind hole so as to fix the separator plate to the top cover plate.

11. The battery cell according to claim 8, wherein a top of the top cover plate is provided with a projection portion, the separator plate is provided with a through hole, and the projection part penetrates the through hole and rivets the separator plate so as to fix the separator to the top cover plate.

12. The battery cell according to claim 8, wherein the separator plate is further provided with an electrode connecting sheet positioning structure, and the electrode connecting sheet positioning structure is configured to limit displacement of an electrode connecting sheet.

13. A battery module, comprising:
    more than two of the battery cells according to claim 10, wherein more than two of the battery cells are arranged in sequence, the sampling channels among more than two of the battery cells are connected to each other, and more than two of the battery cells are electrically connected by the electrode connecting sheet; and
    the sampling member, wherein the sampling member is accommodated in the sampling channels.

14. A manufacturing method for a top cover assembly, comprising following steps:
    providing a separator plate and a top cover plate configured to seal an electrode assembly of a battery cell into a battery housing; wherein a pole is disposed on the top cover plate, a pole through hole and sampling channel(s) for accommodating a sampling member are disposed on the separator plate;
    covering the separator plate on the top cover plate, so that the pole through hole of the separator plate penetrates the pole of the top cover plate; and
    fixing the separator plate to the top cover plate to obtain a top cover assembly;
    wherein the separator plate comprises a first plate and a second plate, the first plate and the second plate both extend along a widthwise direction and are disposed opposite each other along a lengthwise direction, and the sampling channel(s) is formed between the first plate and the second plate.

15. The manufacturing method for a top cover assembly according to claim 14, wherein in the step of covering the separator plate on the top cover plate, specifically comprises:
providing a backside blind hole to the top cover plate;
making a protrusion portion at a bottom of the separator plate;
extending the protrusion portion into the blind hole until the separator plate is attached to the top cover plate; or
making a projection portion at a top of the top cover plate;
providing a through hole to the separator plate; and
making the projection portion penetrate the through hole until the separator plate is attached to the top cover plate.

16. A manufacturing method for a battery cell, comprising following steps:
providing a battery housing equipped with an electrode assembly, and the top cover assembly produced with the manufacturing method for a top cover assembly according to claim 14; wherein the battery housing is provided with an opening; and
assembling the top cover assembly and the battery housing so that the top cover plate seals the opening to produce the battery cell.

17. A manufacturing method for a battery module, comprising following steps:
providing a sampling member, at least one electrode connecting sheet and a plurality of battery cells produced with the manufacturing method for the battery cell according to claim 16;
arranging the plurality of battery cells along a preset direction, so that sampling channels on each battery cell communicate with each other;
welding at least one of the electrode connecting sheet to the poles of the plurality of battery cells, so that the plurality of the battery cells are connected in parallel or in series; and
connecting one end of the sampling member to the electrode connecting sheet, and introducing the other end of the sampling member to the sampling channels to obtain the battery module.

18. The manufacturing method for a battery module according to claim 17, wherein the separator plate of each battery cell is further provided with an electrode connecting sheet positioning structure;
after the step of arranging the plurality of battery cells along the preset direction and before the step of welding the electrode connecting sheet to the pole of the plurality of battery cells, wherein further comprises a following step:
positioning the electrode connecting sheet with the electrode connecting sheet positioning structure of each battery cell.

* * * * *